Feb. 17, 1942.   J. HEDU   2,273,442
HANDLE FOR LUGGAGE OR THE LIKE
Filed Aug. 2, 1940
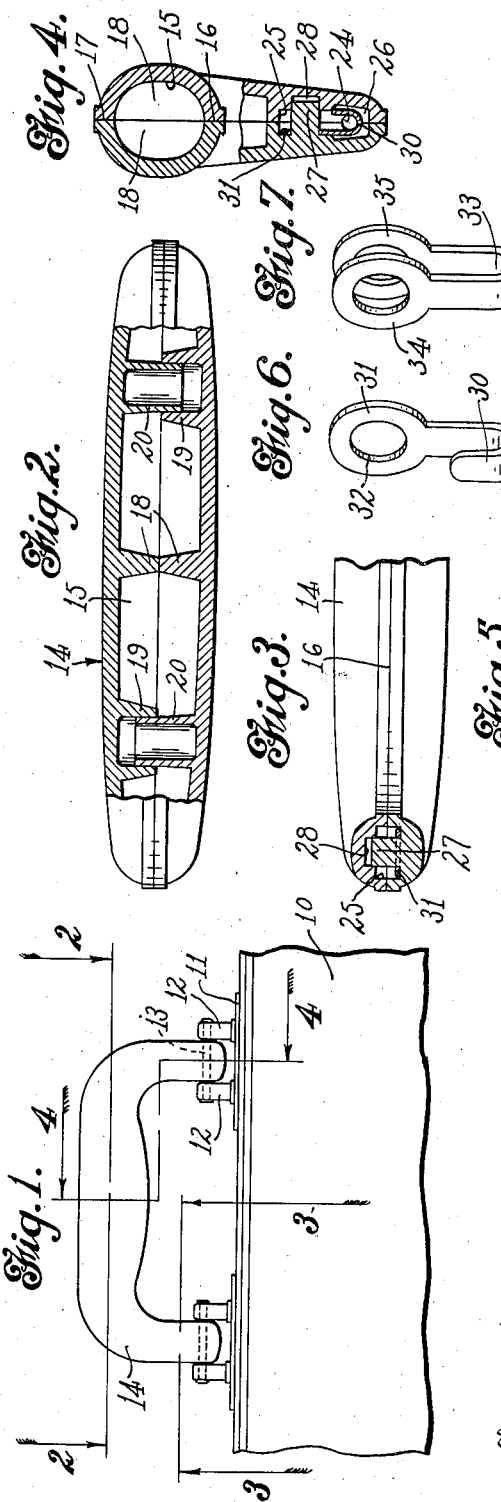
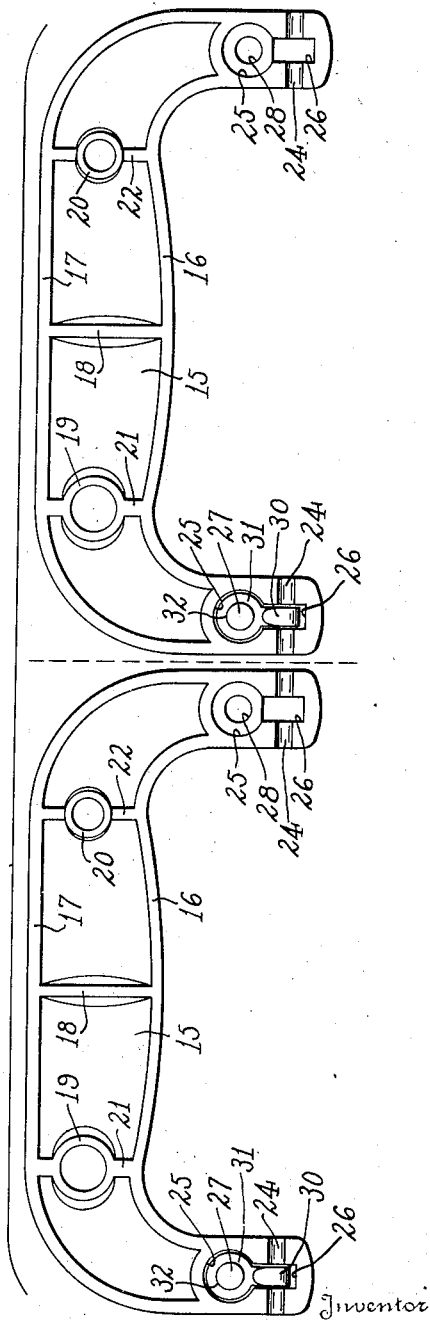

Patented Feb. 17, 1942

2,273,442

UNITED STATES PATENT OFFICE 2,273,442

HANDLE FOR LUGGAGE OR THE LIKE

Jon Hedu, Watertown, Conn., assignor to The Watertown Manufacturing Company, Watertown, Conn., a corporation of Connecticut Application August 2, 1940, Serial No. 349,426

4 Claims. (Cl. 190—57)

This invention relates to handles for grips, and more particularly to a device of this kind suitable to be used as a handle for hand luggage, for example.

In the past luggage handles have been made of leather, and in some instances of Bakelite or Celluloid. When made of plastic material they have usually been of solid construction, and when so constructed the handles are too expensive for wide and general use.

It is contemplated by the present invention to provide a hollow handle made of plastic material, the handle being formed in two identical or substantially identical portions or halves which are thereafter secured together to form a hollow structure of the required shape and size. By making the two parts of the handle identical it is not necessary to have rights and lefts, as with the present construction any two of the handle portions can be secured together in opposing relation to form the complete handle. Each part is made with cooperating engaging members, so that the two parts of the handle, when placed together, will be properly positioned for assembly, and will also be strongly braced against collapse or breakage.

When the device is used as a luggage handle it is normally required to receive a metal pivot pin secured to the piece of luggage. To prevent excessive strain upon the plastic material of which the handle is formed I contemplate the provision of a metal insert to receive this pivot pin, so that this insert will embrace or surround the pin and receive the strain of the weight of the luggage. The parts of the handles are so cast that the pins may be readily placed and retained therein before the parts are assembled, so that the manufacture of the entire device may be effected with a small amount of labor.

One object of the invention is the provision of a luggage handle of new and improved construction.

A further object of the invention is the provision of a luggage handle formed of plastic material in two substantially identical parts, which after being molded may be readily secured together to form the completed handle.

A still further object of the invention is the provision of a luggage handle formed of plastic material, and consisting of two identical parts secured together in opposing relation, which parts are provided with cooperating engaging means to maintain the two parts in assembled position, and to suitably brace the completed structure against breakage or collapse.

To these and other ends the invention consists in the novel features and combinations of parts to be hereinafter described and claimed.

In the accompanying drawing:

Fig. 1 is an elevational view of a luggage handle embodying my improvements, the handle being secured to a piece of luggage;

Fig. 2 is a longitudinal cross-sectional view on line 2—2 of Fig. 1;

Fig. 3 is a sectional view on line 3—3 of Fig. 1;

Fig. 4 is a vertical sectional view on line 4—4 of Fig. 1;

Fig. 5 is a view showing the interior of the two portions of the handle prior to the assembly thereof;

Fig. 6 is a perspective view of one of the metal inserts; and

Fig. 7 is an elevational view of a metal insert of modified form.

To illustrate a preferred embodiment of my invention, I have shown in Fig. 1 of the drawing a portion of a piece of luggage 10 having secured thereto in any suitable way a plate 11 carrying standards 12 through which is inserted a pin 13, the pin being headed or riveted at its ends to prevent detachment from the parts 12. The handle is shown at 14, and, as will be apparent, it is of the usual U-shaped design in elevation, and generally round or oval in cross-sectional form, although the particular form of the handle may be varied as desired. The handle 14 is made in two portions or halves which are substantially identical in form, and which may be placed together in opposed relation along the central longitudinal plane of the completed structure and secured together to form the finished article. As shown in Fig. 5, each of these portions comprises a body portion 15 of substantially U-shaped construction. This body portion in cross-sectional form is of U-shape or semi-oval, the interior thereof being hollow, and the edges 16 and 17 lying in the same plane so that the two half portions may be applied evenly and flatly together to form the hollow handle.

The parts of the handle are preferably made by a molding process of a suitable plastic material, such, for example, as a cellulose acetate plastic, although plastics of other compositions may be employed, so that the portions may be readily formed by the usual molding process. Each of the portions 15 is provided with a centrally located rib 18, the outer edge of which is in the plane of the edges 16 and 17, so that the edge of one rib will abut the edge of the other when the parts are assembled, as shown in Fig. 2, and form a suitable brace.

Also each of the handle portions is provided with a suitable socket 19 and a post 20, which in the form shown is hollow, the socket and post being symmetrically placed with respect to the rib 18, and of such dimensions that when one handle section is applied to the other the post of one will be received in the socket of the other, as shown in Fig. 2, to suitably locate and brace the parts against separation or distortion. As will be apparent from Fig. 5, the two parts of the handles may be made of identical form from the same mold, and when one is reversed in position to be placed upon the other, the post upon one handle portion will correctly register with the socket of the other. Ribs 21 and 22 may extend from the socket member and post to the edges 16 and 17, so that these parts will be suitably strengthened.

Adjacent the ends the handles are provided with semi-cylindrical recesses 24, the recesses of one portion cooperating with those of the other to form openings through the handles to receive the pins 13, and adjacent these openings are provided keyhole-shaped recesses having upper portions 25 of substantially circular shape and lower straight-sided portions 26. Formed centrally within one of the recesses 25 is a post 27 which projects beyond the plane of the adjacent material of the handle. The recess 25 at the other end of the handle portion is formed with a countersunk recess 28 adapted to receive the post 25 when the two handle portions are assembled, as shown more particularly in Figs. 3 and 4.

In order to provide a metallic structure in the handle to receive the pin 13 and bear the weight of the luggage supported by the pin, I provide a hanger or insert one form of which is shown in Fig. 6 and an alternative form in Fig. 7. As shown in the former figure, this hanger comprises a lower hook portion 30 carried by an upper flat eye portion 31 having an opening 32 therein. When the parts are to be assembled this insert is placed in the keyhole-shaped recess adjacent the end of one of the handle portions 15, with the upper eye portion 31 disposed in the circular portion 25 of the recess, and the stud or post 27 received in the opening 32 whereby the insert is suspended upon this post, and will be held in position during the assembly of the parts. It will be noted that the hook portion 30, as shown more especially in Fig. 4, will, when the two halves of the handle are assembled, extend into the other handle portion and will lie in the lower recess portions 26. The hook, therefore, will be in position to receive one of the pins 13 inserted through the opening 24, so that the weight of the luggage will be carried by the hook from the post 25.

In Fig. 7 of the drawing I have shown an alternative form of metal insert comprising a U-shaped lower portion 33 and upper flat eye portion 34 and 35. When this form of insert is used, the post 27 in one of the handle members is received in the openings in the eye portions 34 and 35, and when the two handle portions are assembled the insert or hanger will be housed snugly within the keyhole-shaped recesses of the two handle portions, with the insert being suspended from the post 27.

It will be seen that I have devised a handle member made of two identical portions or halves which may be formed in the same mold, and that these portions when placed together in opposing relation will fit snugly together, having overlapping or telescoping parts which will maintain them in assembled relation. Moreover, I have provided metal hangers or inserts to receive and sustain the weight of the luggage to which the handle is secured, which inserts are supported by posts in one of the handle portions, and which posts telescope into sockets or recesses in the mating portions.

While I have shown and described some preferred embodiments of my invention, it will be understood that it is not to be limited to all of the details shown, but is capable of modification and variation within the scope of the claims.

What I claim is:

1. A handle for luggage or the like formed of plastic material, said handle being comprised of a pair of substantially identical sections, each of said sections having a channeled body to form a hollow structure when the two are assembled in opposing relation, each of said sections being provided with a substantially centrally located brace member, the outer edge of the brace member of one section contacting with the corresponding part of the other section when the two sections are assembled, a socket on one side of said brace member and spaced therefrom, a post upon the other side of said brace member and spaced therefrom a distance equal to the spacing of the socket whereby when said sections are assembled in opposing relation the post of one section will be received in the socket of the other section when the brace members lie in superposed position.

2. A handle for luggage or the like comprising two identical half sections formed of plastic material, each of said sections comprising a channeled body of U-shape in longitudinal section, the ends of each section being provided with recesses, and a metallic insert mounted in one of the recesses of each section whereby when said sections are assembled the inserts will lie partly in the recesses of both sections to be held snugly between the walls of the two sections, said recesses being of keyhole shape in form, and said inserts having an upper circular portion to fit the upper portion of the recess and a lower U-shaped portion.

3. A hollow handle for luggage or the like, said handle being formed of plastic material and having an opening adjacent each end thereof, a metallic insert lying wholly within the handle having a part at its lower end extending about the lower edge of the opening, and means in the handle for supporting said insert, said means comprising a post formed integrally with the handle, and said insert having an opening adjacent its upper end within which said post is received.

4. A hollow handle for luggage or the like, said handle being formed of plastic material and comprising a pair of sections adapted to be secured together in opposing relation, said sections being provided with recesses of keyhole shape adjacent their ends, the recess in one of said handles being provided with an internally projecting post in the upper rounded portion thereof, and there being a countersunk opening in the registering recess of the other section whereby when said sections are assembled together the post is received in said recess, and a hanger member suspended from said post, said member comprising an upper perforated portion and a lower U-shaped portion, and said handle being provided with an opening directed toward the U-shaped portion of said hanger whereby a supporting pin may be inserted through said opening and carried by the U-shaped portion of the hanger.

JON HEDU.